(12) United States Patent
Cheng (10) Patent No.: US 10,367,320 B2
(45) Date of Patent: Jul. 30, 2019

(54) ELECTRICAL CONNECTOR WITH IMPROVED OUTER SHELL

(71) Applicant: FOXCONN INTERCONNECT TECHNOLOGY LIMITED, Grand Cayman (KY)

(72) Inventor: Chih-Pi Cheng, New Taipei (TW)

(73) Assignee: FOXCONN INTERCONNECT TECHNOLOGY LIMITED, Grand Cayman (KY)

(*) Notice: Subject to any disclaimer, the term of this patent is extended or adjusted under 35 U.S.C. 154(b) by 0 days.

(21) Appl. No.: 15/878,372

(22) Filed: Jan. 23, 2018

(65) Prior Publication Data

US 2018/0212356 A1    Jul. 26, 2018

Related U.S. Application Data

(60) Provisional application No. 62/449,133, filed on Jan. 23, 2017.

(30) Foreign Application Priority Data

Mar. 15, 2017 (CN) .......................... 2017 1 0152328

(51) Int. Cl.
| | |
|---|---|
| G02B 6/42 | (2006.01) |
| H01R 13/52 | (2006.01) |
| H01R 31/06 | (2006.01) |
| H01R 13/504 | (2006.01) |
| H01R 13/518 | (2006.01) |

(Continued)

(52) U.S. Cl.
CPC ........... *H01R 31/06* (2013.01); *G02B 6/4269* (2013.01); *G02B 6/4284* (2013.01); *H01R 13/504* (2013.01); *H01R 13/518* (2013.01); *H01R 13/5202* (2013.01); *H01R 13/6273* (2013.01); *H01R 13/631* (2013.01); *H01R 13/6581* (2013.01); *H01R 31/065* (2013.01); *H01R 13/6335* (2013.01)

(58) Field of Classification Search
CPC . H01R 13/658–13/6599; H01R 13/504; H01R 13/631; H01R 13/518; H01R 31/06; H01R 31/065
USPC ......................................... 439/607.01–607.58
See application file for complete search history.

(56) References Cited

U.S. PATENT DOCUMENTS 9,742,098 B2*  8/2017  Zhao .................. H01R 13/5202
9,755,353 B2*  9/2017  Tsai ................... H01R 13/5219
(Continued)

FOREIGN PATENT DOCUMENTS

CN           204651582 U       9/2015

*Primary Examiner* — Gary F Paumen
(74) *Attorney, Agent, or Firm* — Wei Te Chung; Ming Chieh Chang (57) ABSTRACT

An electrical connector includes an outer shell formed by metal-injection mold and a terminal module including a base and a mating tongue extending forwardly from the base and loaded with a plurality of terminals, and a waterproof glue. The shell includes a seat and a sidewall extending forwardly from the seat, the seat defines a front opening and a receiving cavity. The base is received in the receiving cavity and the mating tongue extends across the front opening and located in the mating cavity. The seat defines a pouring hole from an outer face thereof and communicating with the receiving cavity, the glue is filled with gap between the terminal module and the outer shell via the pouring hole.

20 Claims, 14 Drawing Sheets

(51) Int. Cl.
*H01R 13/627* (2006.01)
*H01R 13/631* (2006.01)
*H01R 13/633* (2006.01)
*H01R 13/6581* (2011.01)

(56) References Cited

U.S. PATENT DOCUMENTS

| | | | | |
|---|---|---|---|---|
| 9,966,710 | B2 * | 5/2018 | Chen | H01R 13/502 |
| 2014/0302709 | A1 * | 10/2014 | Zhao | H01R 12/57 |
| | | | | 439/519 |
| 2015/0349466 | A1 * | 12/2015 | Chen | H01R 13/6581 |
| | | | | 439/607.01 |
| 2016/0079689 | A1 * | 3/2016 | Wu | B23K 1/0016 |
| | | | | 439/581 |
| 2016/0141792 | A1 * | 5/2016 | Zhao | H01R 13/6581 |
| | | | | 439/78 |
| 2016/0164218 | A1 * | 6/2016 | Lee | H01R 13/5202 |
| | | | | 439/587 |
| 2016/0294105 | A1 * | 10/2016 | Zhao | H01R 13/5202 |
| 2016/0315423 | A1 * | 10/2016 | Yao | H01R 24/62 |
| 2017/0018864 | A1 * | 1/2017 | Masuyama | H05K 1/18 |
| 2017/0179634 | A1 * | 6/2017 | Du | H01R 13/521 |
| 2017/0187140 | A1 * | 6/2017 | Tsai | H01R 13/521 |
| 2017/0288360 | A1 * | 10/2017 | Zhao | H01R 13/5219 |
| 2017/0338586 | A1 * | 11/2017 | Wang | H01R 13/5219 |
| 2017/0365955 | A1 * | 12/2017 | Li | H01R 13/6581 |
| 2018/0097298 | A1 * | 4/2018 | Ju | H01R 13/04 |
| 2018/0175556 | A1 * | 6/2018 | Zhao | H01R 13/6581 |

* cited by examiner

ELECTRICAL CONNECTOR WITH IMPROVED OUTER SHELL

BACKGROUND OF THE INVENTION

1. Field of the Invention

The present invention relates to an electrical connector with an improved outer shell forming by metal-injection mold.

2. Description of Related Art

USB-IF has issued a new receptacle which can be inserted by a plug in two different orientation on Oct. 11, 2014 and named USB Type-C transmitting USB 2.0 and USB 3.1 signal. USB 2.0 Type-C connector and cable assembly are widely used in mobile device like smart phones and tablet PCs. As the mobile devices tend to be more and more small, the receptacle is still hoped to be lower profile even through the USB Type-C has a smaller dimension.

CN Patent Issued No. 204651582U discloses a USB Type C receptacle connector which enclosed with a waterproof outer shell formed by metal-injection mold. The kind of outer shell has a thickened dimension, not suitable for smaller mobile device In view of the above, an improved electrical connector is desired to overcome the problems mentioned above.

SUMMARY OF THE INVENTION

Accordingly, an object of the present disclosure is to provide a an electrical connector with an improved outer shell.

According to one aspect of the present disclosure, an electrical connector comprises an outer shell formed by metal-injection mold a terminal module comprising a base and a mating tongue extending from the base and loaded with a plurality of terminals and a waterproof glue. The outer shell comprises a seat and a sidewall extending forwardly from the seat, the side wall defines a mating cavity between the sidewall and in front of the seat, the seat defines a front opening and a receiving cavity. The terminals comprise contacting portions exposed upon mating surface of the mating tongue and leg portions extending out of the base. The base is receiving in the receiving cavity of the seat and the mating tongue extends across the front opening and is located in the mating cavity. The seat of the outer shell defines a pouring hole from an outer face thereof to the receiving cavity, the glue is filled with gap between the terminal module and the outer shell via the pouring hole.

Other objects, advantages and novel features of the disclosure will become more apparent from the following detailed description when taken in conjunction with the accompanying drawings.

DETAILED DESCRIPTION OF THE INVENTION

Reference will now be made to the drawings to describe a preferred embodiment of the present disclosure in detail.

Figure 1:
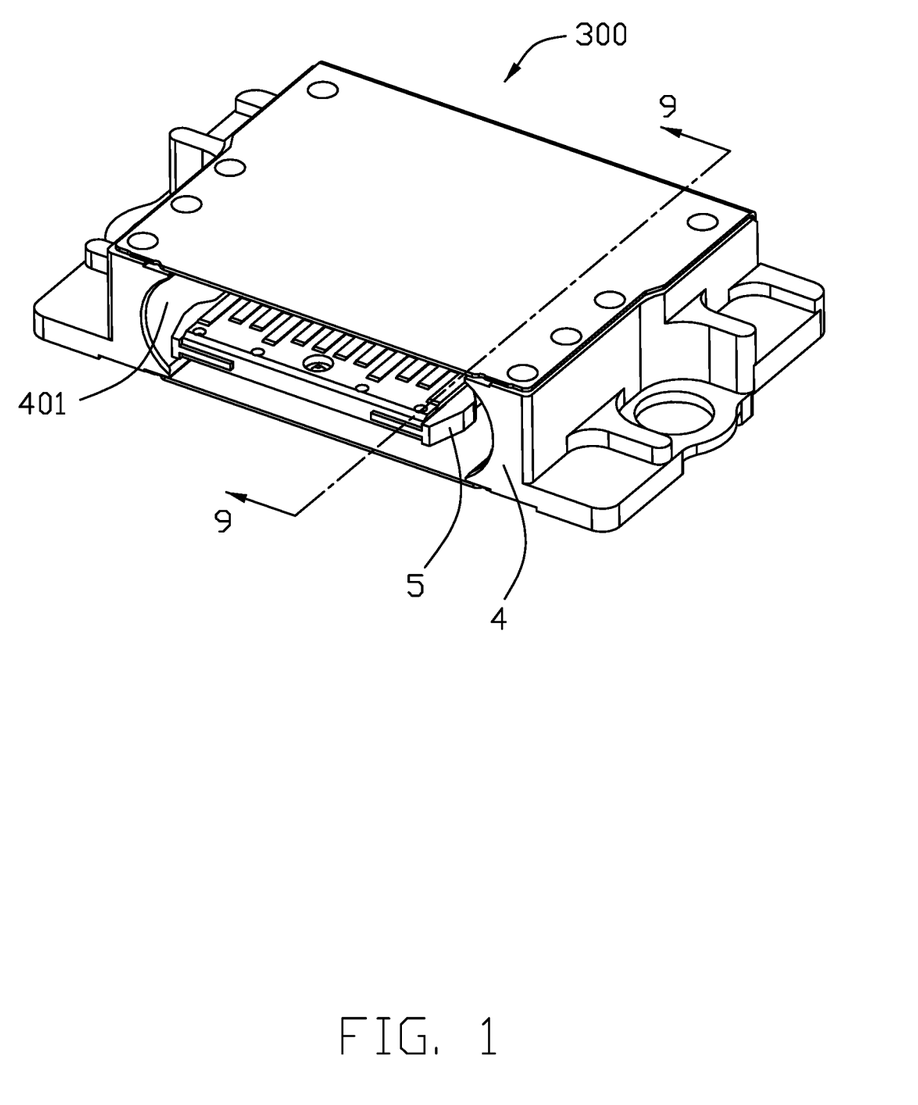
FIG. 1 is a front perspective view of an electrical connector in accordance with a preferred embodiment of the present invention.
Figure 2:
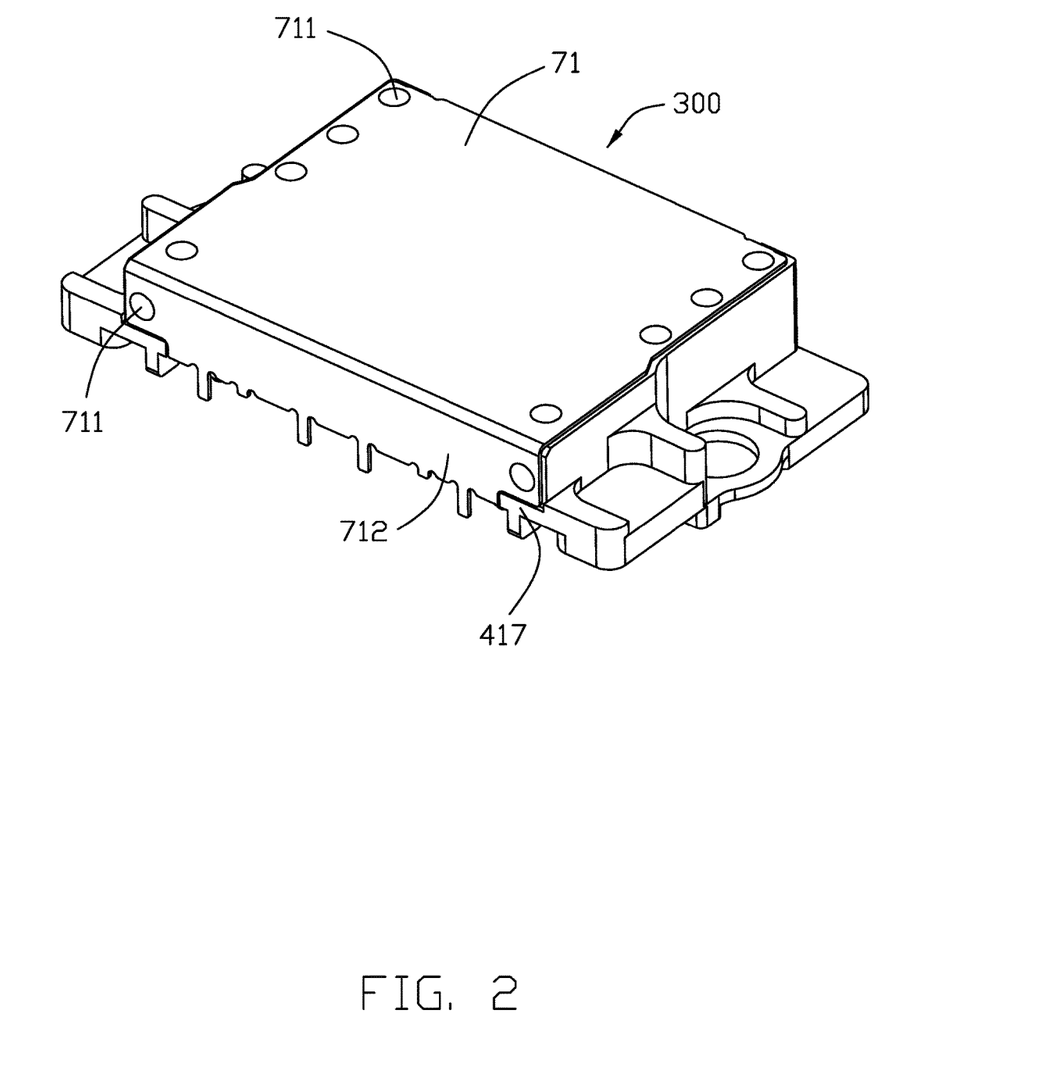
FIG. 2 is a rear perspective view of the electrical connector in FIG. 1.
Figure 4:
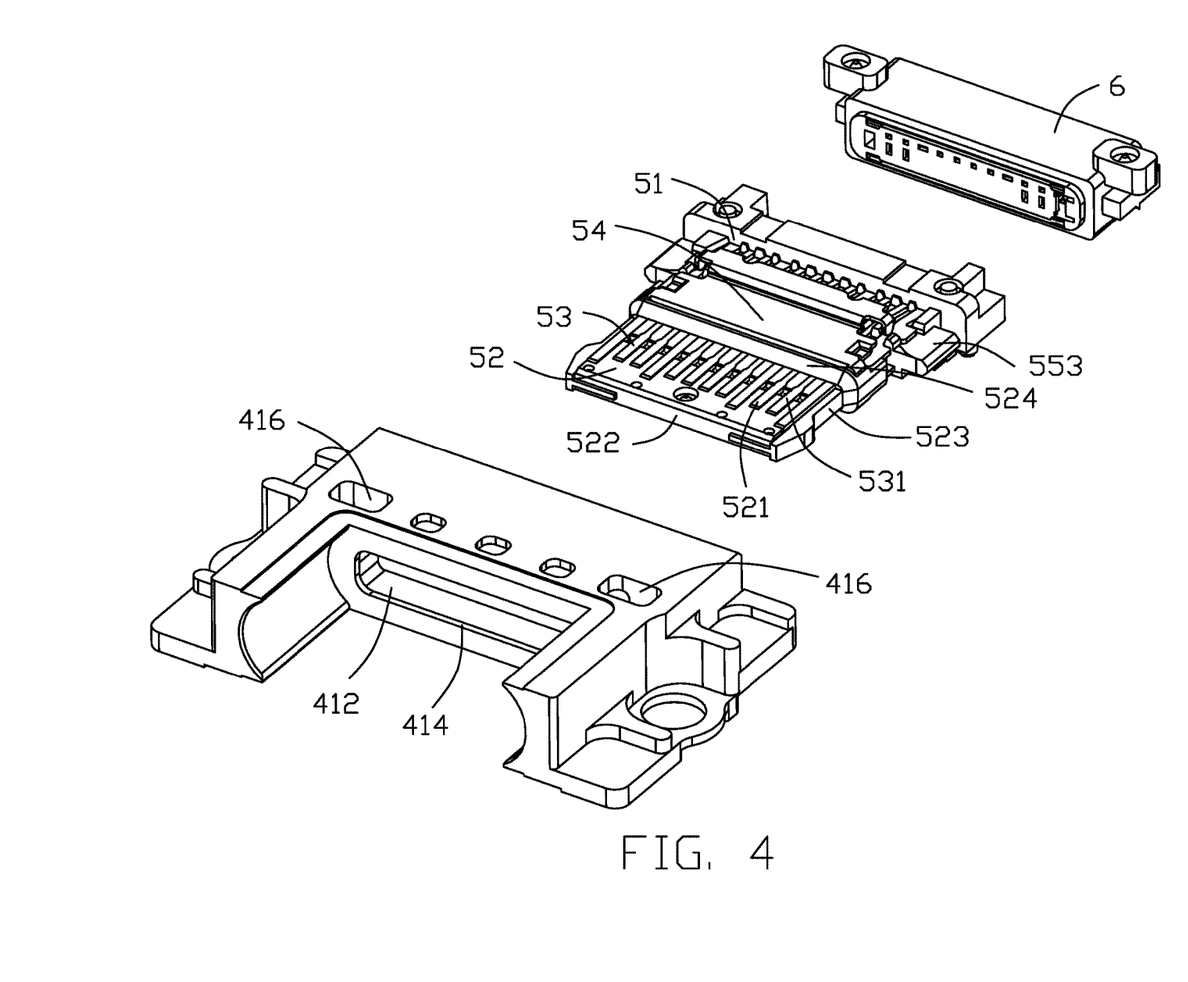
FIG. 4 is a further exploded perspective view of the electrical connector in FIG. 3.

Referring to FIGS. 1 and 2, a lower profile electrical connector 300 is illustrated, which is mounted on a printed circuit board or mother board (not shown) and simultaneously on an in device, such as smart phone or tablet PC so as to be inserted with a plug cable. In this embodiment, the connector 300 is build on a USB Type-C receptacle connector and includes an outer shell 4, a terminal module 5 received and retained in the outer shell 4, a waterproof glue 6 as shown in FIG. 4 and a pair of side boards or metallic plates 7 retained on the shell 4. The outer shell 4 and the side boards 7 collectively defines a mating cavity 401 thereamong.

Figure 5:
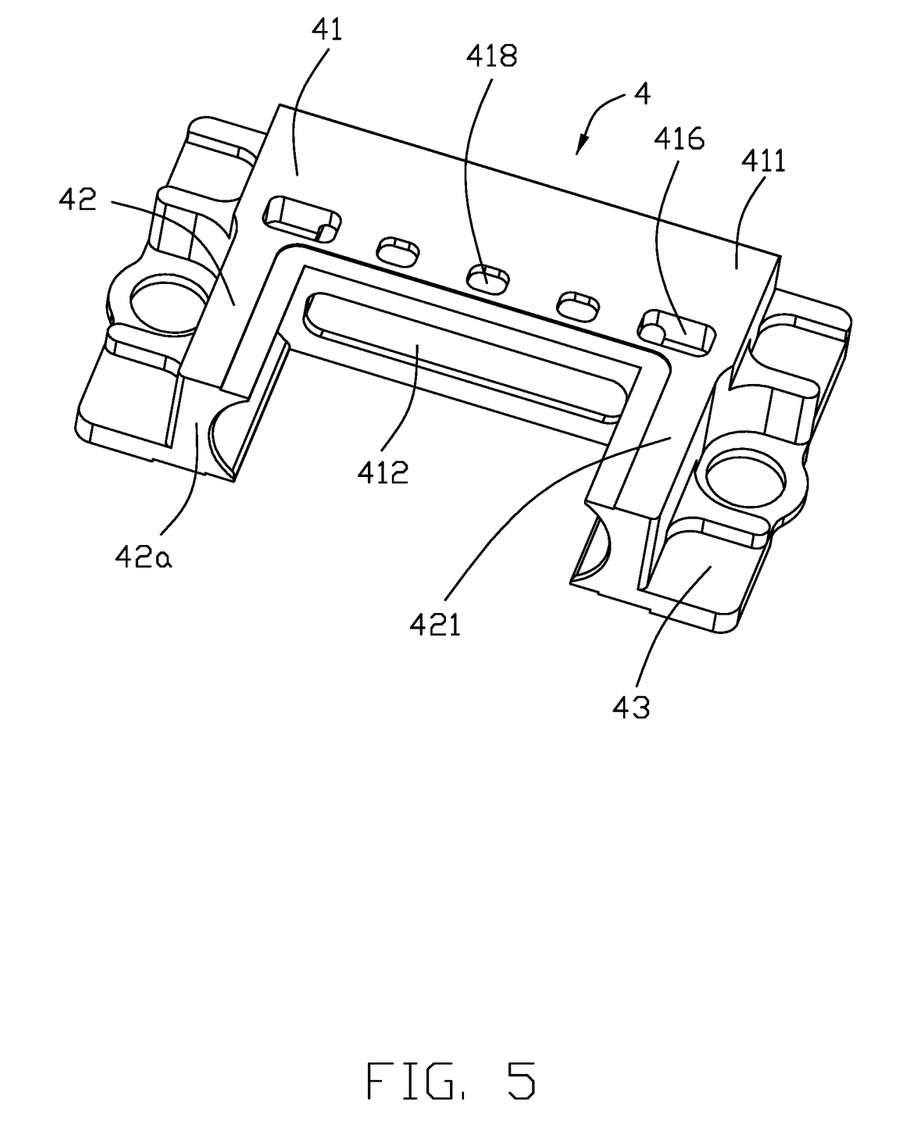
FIG. 5 is a front perspective view of the outer shell in FIG. 4.
Figure 6:
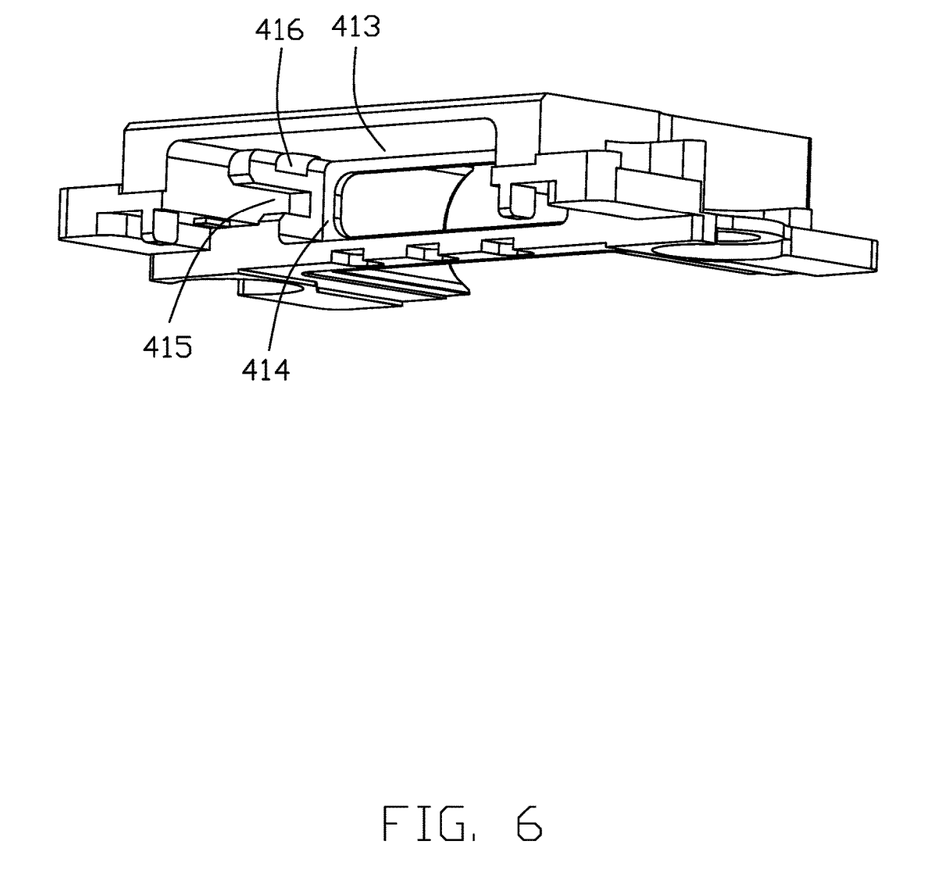
FIG. 6 is a rear perspective view of the outer shell in FIG. 5.

Referring to FIGS. 5-6 connected with FIG. 4, the outer shell 4 is formed by metal-injection mold and includes a seat 41 and sidewall 42 extending forward from the seat, in this embodiment, the sidewall 42 includes a pair of short sidewall 42a located at opposite ends of the mating tongue 52 without any longer sidewalls parallel to the mating tongue 52. Therefore, the mating cavity 401 are exposed to an exterior in a vertical direction, the upper surface 421 of the short sidewalls 42a are level with the upper surface 411 of the seat 41. The lower surface of the shell is substantially in a same plane. The seat 41 defines a front opening 412 and a receiving cavity 413 opening rearwards. The seat defines a ring-like rib 414 at the front opening 412 and guiding slots 415 at the opposite inner sides of the receiving cavity 413. The seat 41 further defines pouring holes 416 from the outer faces thereof to the receiving cavity 413. The pouring holes have a larger entrance, of a rectangular shape at the outer face of the seat sop that the melted glue can be poured easily. Mounting portions 43 extend laterally from opposite ends of the seat 41 and the sidewalls 42, which are in a same plane with lower surface 411 of the seat. As best shown in FIG. 6, lower wall of the seat is shorter to expose the leg portions of the terminals.

Figure 3:
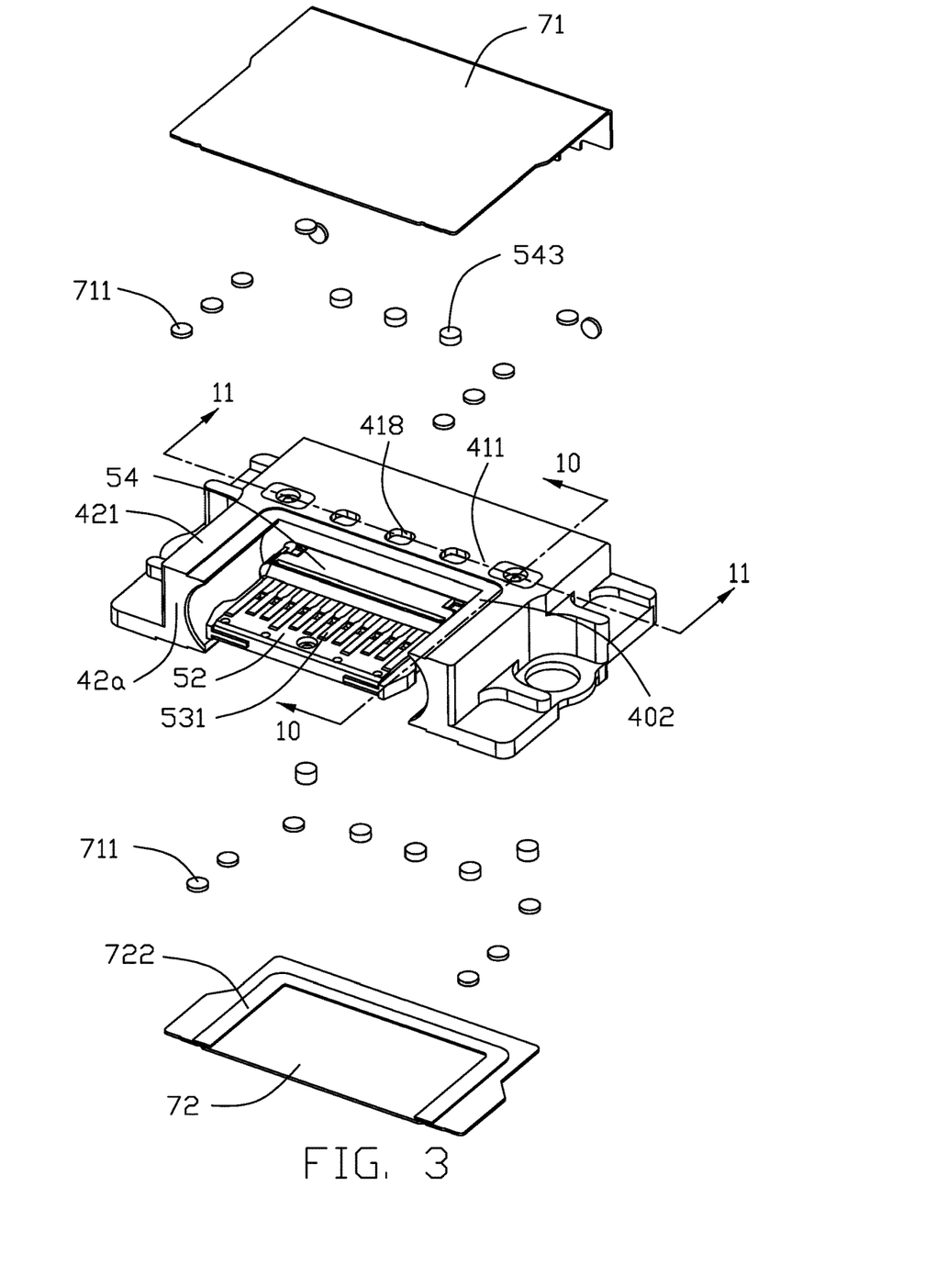
FIG. 3 is a partially exploded perspective view of the electrical connector in FIG. 1.
Figure 9:
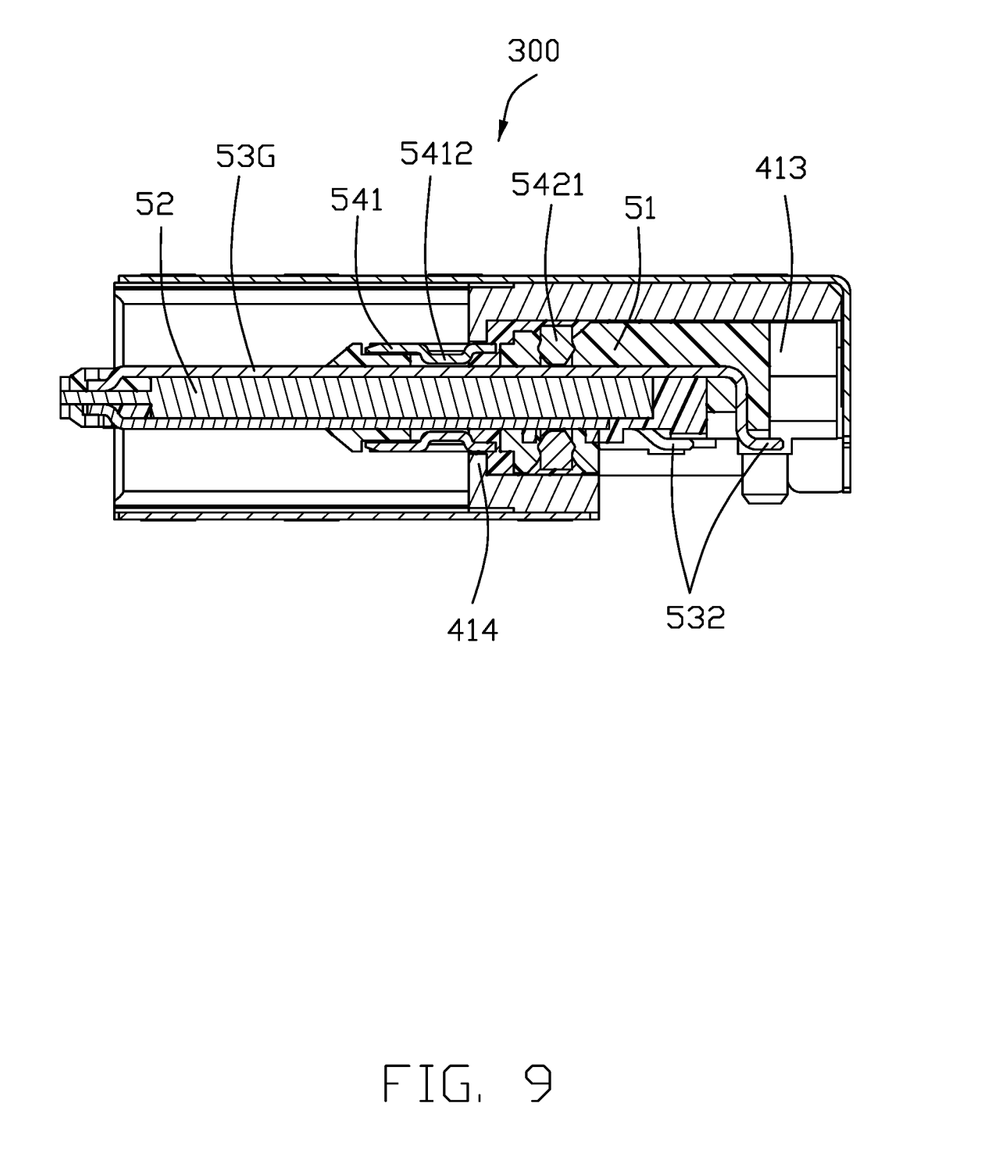
FIG. 9 is a cross-sectional view of the connector taken along broken lines 9-9.

Referring to FIGS. 3-4, the terminals module 5 includes a base 51, a mating tongue 52 extending forward from the base and a plurality of terminals 53, the mating tongue defines opposite mating surfaces 521, a front face 522 and two end walls 523 connecting with the mating surfaces 521. The terminals 53 includes contacting portions 531 exposed upon the mating surfaces 521 and leg portions 532 extending out of the base 51 as best shown in FIG. 9. Combination with FIG. 9, the base 51 of the terminal module 5 is received in the receiving cavity 413 and the mating tongue 52 extends through the front opening 412 and into the mating cavity

401. Combination with FIGS. 10-11, the glue 6 is poured through the pouring holes 416 and flow into the receiving cavity 413 to seal gaps between the terminals module 5 and the outer shell 4. The base 51 is blocked behind the ring-link rib 414 as best shown in FIG. 9. The ringlink rib 414 not only limit the terminal module 5 in the front and back direction and also avoid the mating tongue from polluting during pouring process of the glue. The terminal module 5 defines guiding rib 553, which slides into the guiding slots 415 of the shell so as to assemble the terminal module 5 in the receiving cavity 413.

The pair of short sidewalls 42a are separately located at two opposite ends of the mating tongue 52, its arc-shape insides faces meet definition of the USB Type-C Specification and outer faces are suitable to be assembled in the electronic device. The short sidewalls 42a defines upper surface and lower surfaces which are level with corresponding surface of the seat 41. The seat 41 defines two pouring holes 416 opening to the upper face while the lower surface do not define such pouring holes. The pouring holes 416 are located near the short sidewall 42a. In pouring process, only one hole is used to work and the other pouring hole is reminded to let off steam, so as to avoid the glue flowing to the lower surface.

Referring to FIG. 3, the pair of metallic side boards 7 includes a first board 71 and a second board 72 attached on the upper and lower surfaces of the short sidewalls 42a and the seat 41, thereby collectively defining said mating cavity 401. The shell 4 defines shallow recesses 402 around the inner edges of upper surface and lower surface of the short sidewalls and the seat, a waterproof film 722 is adhered to inside of the side board and then the side board with the film 722 is stuck in the shallow recess 402. Then, the first and second board 71, 72 are retained on the outer shell 4 by laser-welded as shown in FIG. 2 the first and second board have welded points 711. The first board 71 further defines a rear wall 712 bending to cover the rear end of the shell 4 and terminal module 5. The rear wall 712 is laser-welded to the outer shell and further press against rearward ribs 417 defined on the shell.

Figure 7:
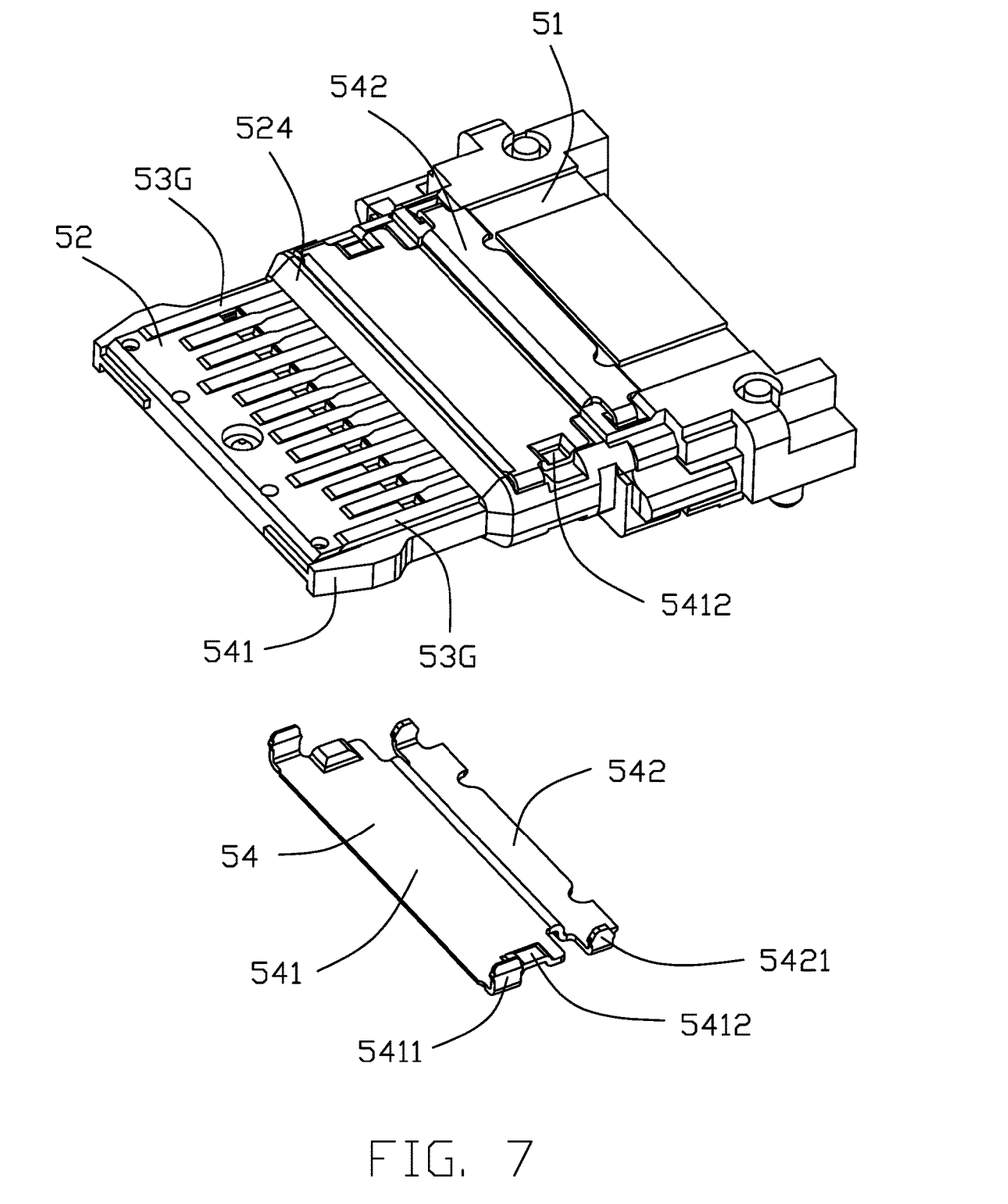
FIG. 7 is a partially perspective view of terminal module.
Figure 10:
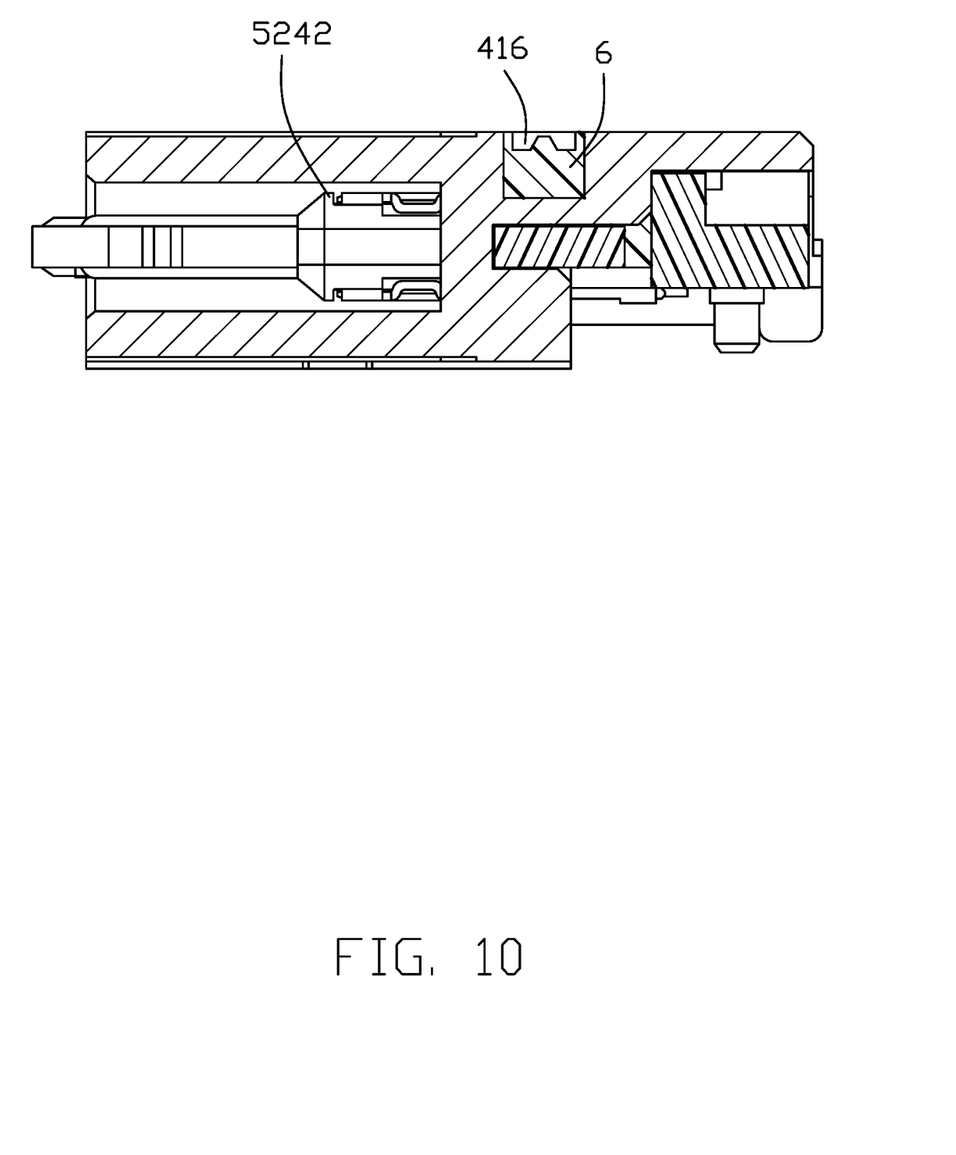
FIG. 10 is a cross-sectional view of the connector taken along broken lines 10-10.
Figure 11:
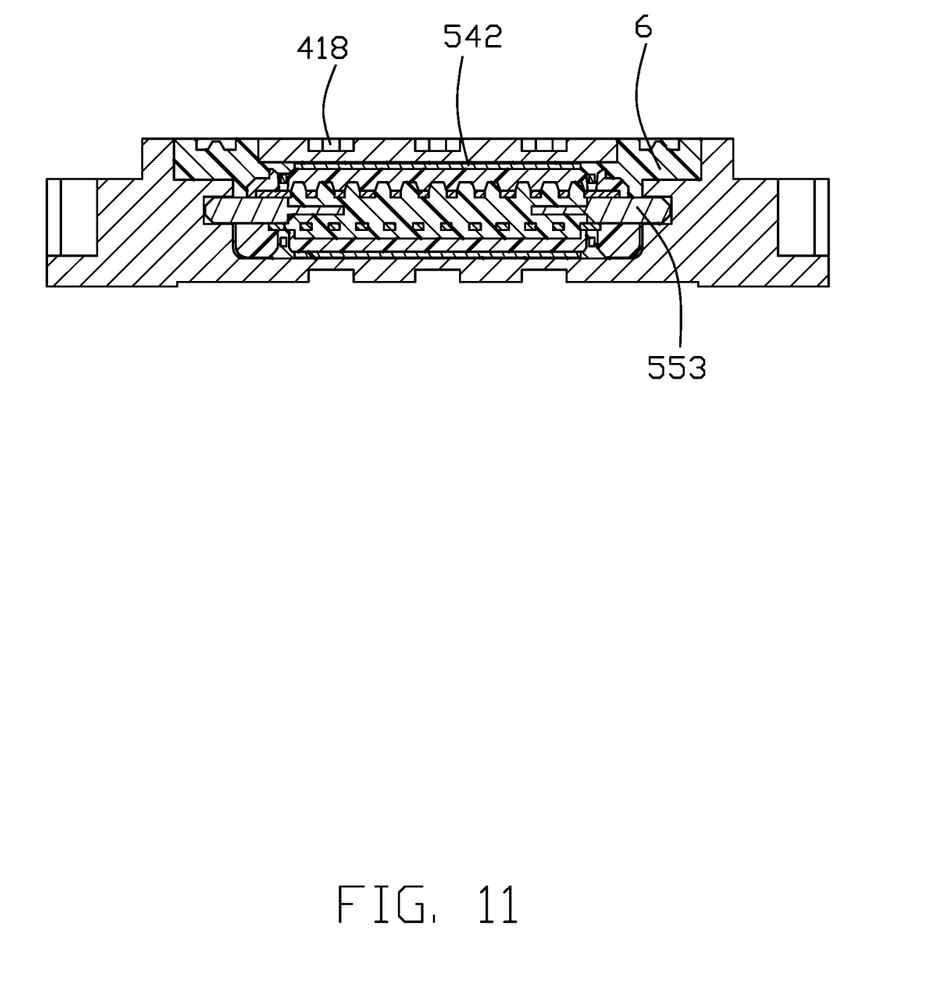
FIG. 11 is a cross-sectional view of the electrical connector taken along broken lines 11-11 in FIG. 1.

Referring to FIG. 7, the mating tongue 52 defines a thickened step portion 524 at a root to the base 51 and a pair of grounding members 54 attached on the step portion 524. Each grounding member 54 includes a grounding portion 541 covering on the upper or lower surface of the step portion 524 and a connecting portion 542 extending rearward from the grounding portion and covering the base 51. Combination with FIG. 3, the connecting portions are laser-welded to the shell 4 with several welded points 543. In preferred embodiment, the shell 4 defines shallow holes 418 at upper and lower surface thereof, through which the shell 4 are laser-welded with the connecting portion 542, the welded points 543 are in the shallower holes 418. The welded points 543 are located between the two pouring holes 416. In preferred embodiment, the pair of grounding member 54 has a same construction, the grounding portion 541 includes two first retaining portions 5411 at opposite ends thereof to be fitly inserted in the step portion 524 and concave portion 5412 behind the retaining portions 5411, the concave portion are connecting with the grounding terminals 53G as best shown in FIG. 9, the concave portions are welded with the grounding terminals 53G by laser-weld or tin solders. The connecting portion 542 defines second retaining portions 5421 at opposite ends to be fitly inserted in the base 51. As shown in FIGS. 7 and 10, the grounding members 54 are behind the front rib 5242 and sunk in the step portions. The front rib 5242 not only guides insertion of the plug connector, but also blocks the melted sin solder from escaping to the mating tongue 52. The front rib 5242 laterally extends to the opposite ends of the step portion 524.

Figure 8:
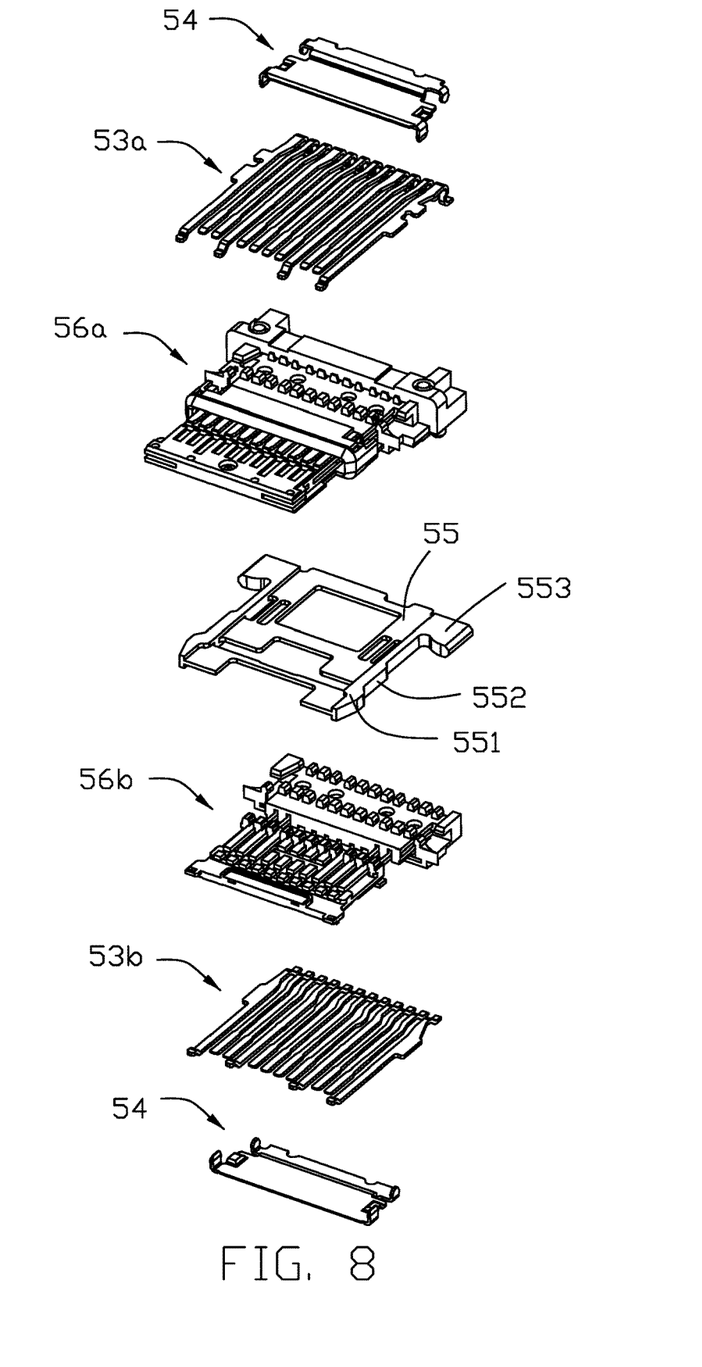
FIG. 8 is a further perspective view of terminal module in FIG. 7.

Referring to FIG. 8, the terminal module 5 further is equipped with a metallic plate 55 between the two rows of the terminals. The metallic plate 55 extends from the mating tongue 52 to the base 51 and defines two thickened sides 551. The thickened sides 551 are constructed as two sides of the mating tongue 52 and define latching sides 552 at outer faces thereof. The guiding ribs 553 are formed on the lateral extending portion of the plate. The metallic plate 55 is formed by a cold forging process from a thickened plate so as to get a stronger performance.

Referring to FIG. 8, the terminal modules is equipped with said metallic plate 55, upper and rows of terminals 53a, 53b, a pair of grounding members 54 and a mold first insulator 56a and a mold second insulator 56b, thereby forming the terminal module 5.

Figure 12:
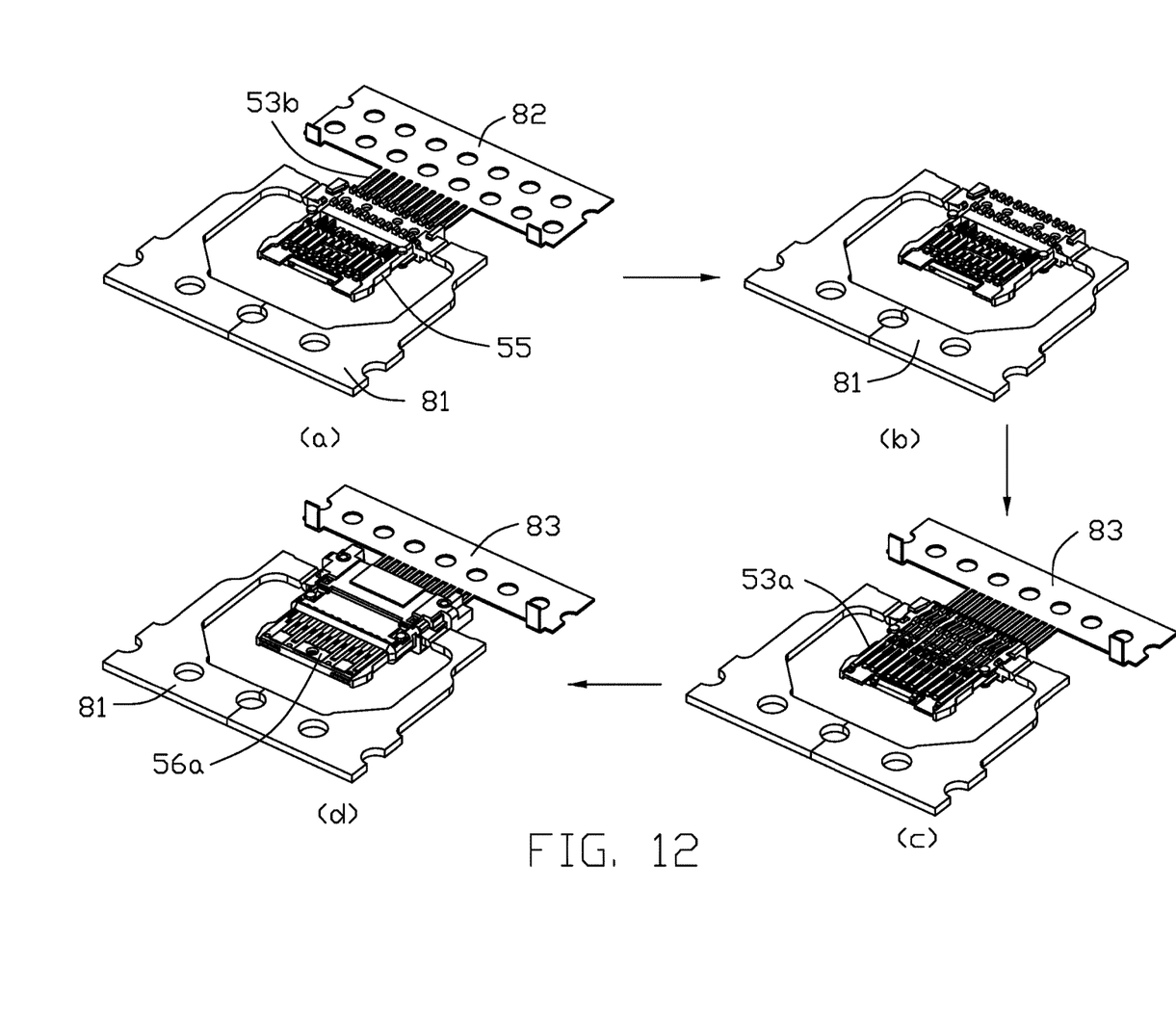
FIG. 12 through FIG. 14 illustrate production processes of the connector.
Figure 13:
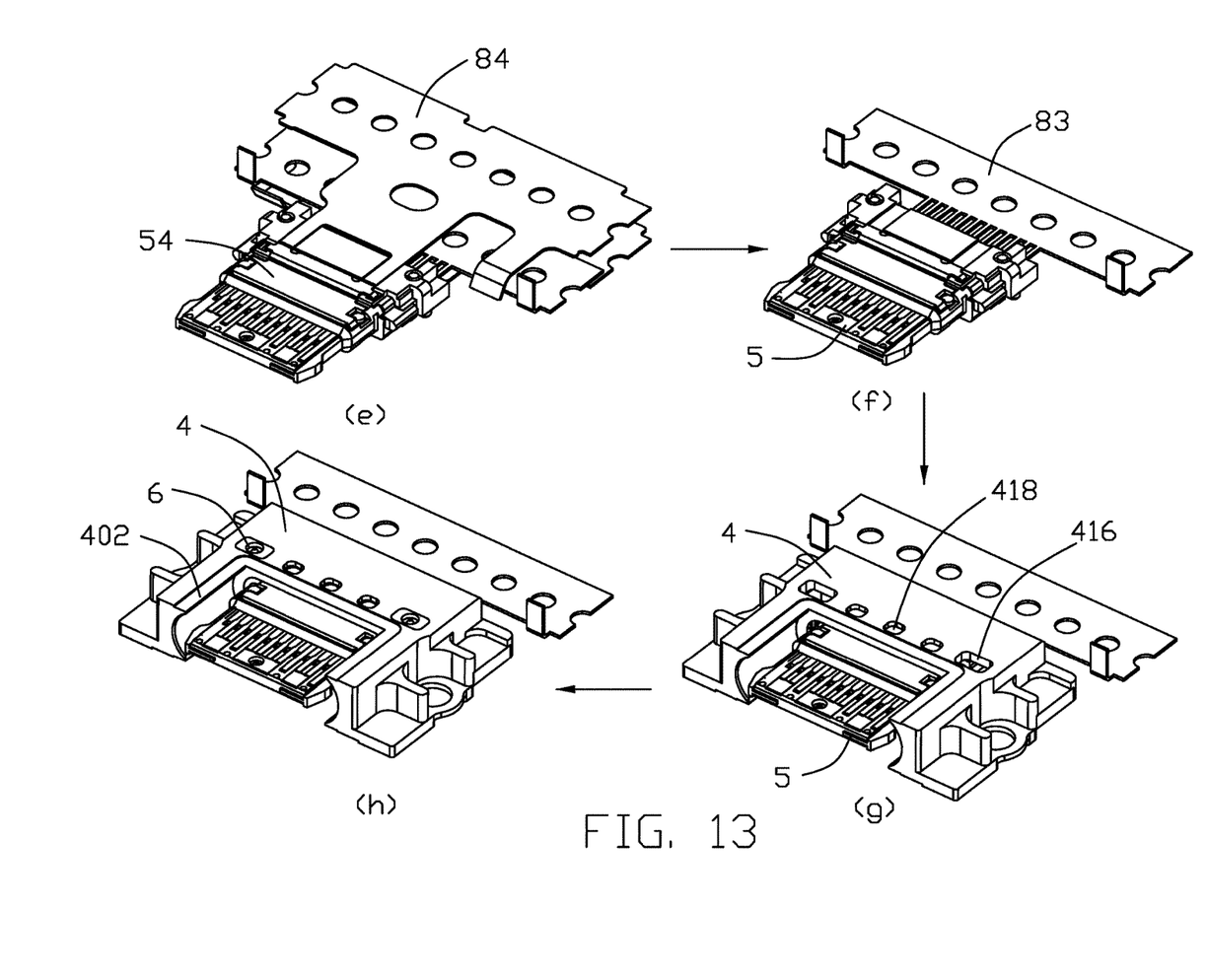
Figure 14:
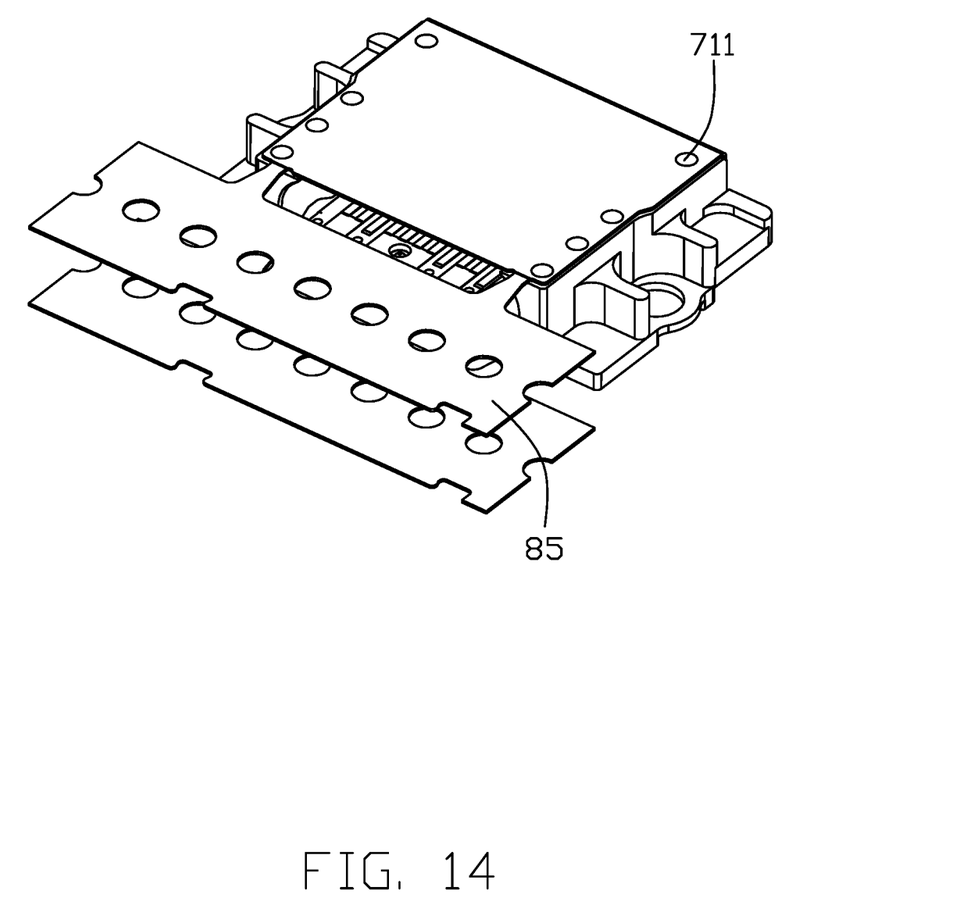

FIGS. 12 through 14 illustrate a injection molding process of the receptacle connector 300. The method of molding the connector includes following steps:

Step one, forming a bottom sub-assembly with the metallic plate and the lower terminals 53b via a first injection mold process. The metallic plate 55 with a first positioning carrier 81 located in front of the metallic plate 55 and connecting with lateral sides of the plate 55 and the lower terminals 53b with a second positioning carrier 82 connecting with leg portions of the lower terminals are formed. Please note the plate 54 is formed by forging firstly and then punching and plating. The plate 55 and the lower terminals 53b are disposed in a related position in a mold cavity and insulative resin material is injected into the mold cavity and surrounded the plate and the lower terminals so that the resin material is formed as the first insulator 56a and the plate and lower terminals are embedded within the first insulator as shown in FIG. 12(a). During the first injection molded process, the first insulator 56a is poured from front and rear ends of the lower terminals. Then the second positioning carrier 82 and connecting brides between the middle portions of the lower terminals are cut away, as shown in FIG. 12(a).

Stet two, assembling the upper row of terminals 53a on the upper surface of the first insulator 56a as shown in FIG. 12(c). The thickened sides 551 of the metallic plate 55 extend rearward longer enough to support the first insulator 56a.

Step three, forming as assembly with upper and lower terminal 53a and the metallic plate 55 via a second injection mold process. Resin material which formed a second insulator 53b is injection molded with the first insulator 56a with the upper terminals 53a so as to completely form the terminal module 5 as shown in FIG. 12(d). Then the first positioning carrier 81 is cut away. After that, the third positioning carrier 83 connecting with the upper terminals 53a begins to work.

Step four, assembling the grounding members and dipping solder paste. The pair of the grounding member 54 with predetermined shape is assembled to the step portion 524 and the sin solder pastes are dipping to the opposite ends of the grounding members 54 as shown in FIG. 13(e). Then the fourth positioning carries 84 connecting with the grounding members are cut away as shown in FIG. 13(f).

Step five, assembling the outer shell 4 and the terminal module 5. The terminal module 5 is forwardly assembled into the shell 4 from the rear end of the shell as shown in FIG. 13(g). Then the inside of the shell and the connecting portion 542 of the grounding member are welded together by laser weld at the shallow holes 418 defined on the shell.

Step six, dipping the waterproof glue. The glue 6 is poured in the pouring holes 416 and flow to the receiving cavity 413. The glue is cooled down and formed to a glue board 6 as shown in FIG. 13(*h*).

Step seven, reflowing oven curing and solidifying the glue and the solder pastes. Please notes, since the solder pastes and the glue have different melted point, there are two different temperatures corresponding to the solder pastes and the glue. After that, the third positioning carriers are cut away.

Step eight, attaching the side boards 7. The films 722 are stuck to the inner side of the side board and then are put in the shallow recesses 402. Then the side boards 7 are laser welded to the shell 4 as show in FIG. 14. The five positioning carrier 85 on the side board are cut away.

Please notes, not every step are needed in alternative embodiment, for example, the grounding members can be canceled.

The metallic plate 55 is made from stainless steel by cold forging process and nitrocarburized to boost its hardness and abrasion resistance thereby the metallic plate is blackening.

While preferred embodiment in accordance with the present disclosure has been shown and described, equivalent modifications and changes known to persons skilled in the art according to the spirit of the present disclosure are considered within the scope of the present disclosure as defined in the appended claims.

What is claimed is:

1. An electrical connector comprising:
an outer shell formed by metal-injection molding and comprising a seat and a sidewall extending forwardly from the seat, the sidewall comprising short sidewalls defining a mating cavity therebetween and in front of the seat, the seat defining a front opening and a receiving cavity;
a terminal module comprising a base and a mating tongue extending from the base and loaded with a plurality of terminals, the terminals comprising contacting portions exposed upon mating surface of the mating tongue and leg portions extending out of the base;
the base received in the receiving cavity of the seat and the mating tongue extending across the front opening and located in the mating cavity; and
a waterproof glue;
wherein the seat of the outer shell defines a pouring hole from an outer face thereof which communicates with the receiving cavity, the glue fills a gap between the terminal module and the outer shell via the pouring hole.

2. The electrical connector as claimed in claim 1, wherein the pouring hole is disposed on an upper surface of the seat and the leg portions of the terminals extend from a lower surface of the seat.

3. The electrical connector as claimed in claim 2, wherein the seat defines a ring-link rib at the front opening, the base of the terminal module is limited behind the ring-link rib and the pouring hole is located behind the ring-link rib.

4. The electrical connector as claimed in claim 1, further comprising a grounding member, wherein the mating tongue defines a thickened step portion at a root to the base, the grounding member comprises a grounding portion covering the step portion and a connecting portion extending from the grounding portion and covering the base, the outer shell and the connecting portion are welded together.

5. The electrical connector as claimed in claim 4, wherein the grounding member comprises a pair of grounding pieces with a same structure and attached to an upper and lower surfaces of the terminal module.

6. The electrical connector as claimed in claim 4, wherein the plurality of terminals comprise grounding terminals, the grounding portion defines a pair of concave portions at opposite ends thereof, and the concave portions are welded with corresponding grounding terminals.

7. The electrical connector as claimed in claim 6, wherein The grounding portion defines first retaining portions at opposite ends thereof and fitly inserted in the step portion, the connecting portion defines second retaining portions at opposite ends thereof and fitly inserted in the base, the concave portions are located behind the first retaining portions.

8. The electrical connector as claimed in claim 1, wherein the receiving cavity defines guiding slots at the opposite inner sides thereof, the terminal module defines guiding ribs sliding into the guiding slots.

9. The electrical connector as claimed in claim 8, wherein the terminal module defines a metallic plate embedded therein, the metallic plate extends from the mating tongue to the base and defines thickened sides to be constructed as two sides of the mating tongue and define latching sides at outer faces thereof.

10. The electrical connector as claimed in claim 9, wherein the guiding rib integrally and laterally extends from the metallic plate.

11. The electrical connector as claimed in claim 2, wherein the seat defines two pouring holes near a root to the sidewalls.

12. The electrical connector as claimed in claim 1, wherein the short sidewalls are separately located at opposite ends of the mating tongue without any long sidewalls parallel to the mating tongue.

13. The electrical connector as claimed in claim 12, comprising a pair of side boards welded with an upper and lower surface of the seat and the pair of short sidewalls.

14. The electrical connector as claimed in claim 13, comprising a pair of waterproof films adhered to inner sides of the side boards.

15. An electrical connector comprising:
a terminal module comprising a base and a mating tongue extending from the base and loaded with a plurality of terminals, the terminals comprising contacting portions exposed upon the mating tongue and leg portions extending out of the base;
an outer shell formed by metal-injection molding and comprising a seat and a pair of short sidewalls extending forwardly from the seat, the seat defining a front opening and a receiving cavity, the base being received in the receiving cavity of the seat and the mating tongue going across the front opening and being horizontally located between the pair of short sidewalls;
a pair of side boards covering upper and lower surfaces of the seat and the pair of short sidewalls to collectively define a mating cavity; and
a pair of waterproof films adhered at inner sides of corresponding side boards;
wherein the upper and lower surfaces of the seat and the pair of short sidewalls define shallow recesses, and edges of the waterproof films are received in the shallow recesses.

16. The electrical connector as claimed in claim 15, wherein the seat defines two pouring holes at an upper surface thereof which communicates with the receiving cavity, a waterproof glue is dipping from the pouring holes and sealing gaps between the terminal module and the outer shell.

17. The electrical connector as claimed in claim 15, wherein the outer shell defines mounting portions laterally extending from opposite outer ends of the seat and the short sidewalls.

18. An electrical connector comprising:
a contact module including two rows of contacts and a shielding plate commonly integrally formed within an insulative housing via more than one insert-molding processes, each of said contacts extending along a front-to-back direction, each row of said two rows of contacts being arranged in a transverse direction perpendicular to said front-to-back direction, the two rows of contacts respectively located by two sides of the shielding plate in a vertical direction perpendicular to both said front-to-back direction and said transverse direction, the insulative housing forming a tongue portion with two opposite mating surfaces on which contacting sections of the contacts are exposed in the vertical direction;

a metallic outer shell made by metal injection molding with an opening through which the contact module is forwardly assembled to the outer shell, said outer shell forming a pair of short sidewalls by two sides of the tongue portion in the transverse direction while exposing the tongue portion in the vertical direction; and a pair of metallic plates soldered upon opposite sides of the outer shell in the vertical direction to shield the tongue portion in said vertical direction; wherein a thickness of said metallic plate in the vertical direction is smaller than a thickness of each of said short sidewall in the transverse direction.

19. The electrical connector as claimed in claim 18, wherein said short sidewall forms a curved interior surface and an upstanding outer surface so as to form a varied thickness thereof in the transverse direction.

20. The electrical connector as claimed in claim 19, wherein each of said metallic plate is soldered upon the pair of short sidewalls.

* * * * *